(12) United States Patent
Staszewski

(10) Patent No.: US 6,523,052 B1
(45) Date of Patent: Feb. 18, 2003

(54) METHOD AND ARCHITECTURE TO FACILITATE ACHIEVING A FAST EPR4 EQUALIZATION START-UP IN A MAGNETIC RECORDING READ CHANNEL

(75) Inventor: Robert B. Staszewski, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/430,385

(22) Filed: Oct. 29, 1999

Related U.S. Application Data

(63) Continuation-in-part of application No. 09/258,594, filed on Feb. 26, 1999, and a continuation-in-part of application No. 09/258,827, filed on Feb. 25, 1999, and a continuation-in-part of application No. 09/258,045, filed on Feb. 25, 1999, and a continuation-in-part of application No. 09/256,568, filed on Feb. 24, 1999, and a continuation-in-part of application No. 09/256,420, filed on Feb. 24, 1999, and a continuation-in-part of application No. 09/224,364, filed on Dec. 31, 1998.
(60) Provisional application No. 60/122,196, filed on Mar. 1, 1999.

(51) Int. Cl.⁷ .......................... G06F 17/10; G11B 5/035
(52) U.S. Cl. ......................................... 708/322; 360/65
(58) Field of Search .......................... 708/319, 322–323; 375/290; 360/65; 369/59.22

(56) References Cited

U.S. PATENT DOCUMENTS 6,185,175 B1 * 2/2001 Zook ..................... 369/59.22
6,249,398 B1 * 6/2001 Fisher et al. .................. 360/65

* cited by examiner

*Primary Examiner*—Tan V. Mai
(74) *Attorney, Agent, or Firm*—W. Daniel Swayze, Jr.; W. James Brady; Frederick J. Telecky, Jr.

(57) ABSTRACT

A method and circuit (10) for achieving a fast EPR4 equalization start-up for an FIR filter (14) in a magnetic recording read channel is presented in which a three-level adaptation in an LMS coefficient equalizer (34) at an FIR output (16) is performed to provide a rough estimate of coefficients to said FIR filter (14). A 1+D operation (20) on the FIR output (16) is performed to generate an indirect mode EPR4 equalized signal (26), which may be applied to an input of a detector (32) of the read channel. After a predetermined time, the EPR4 equalized signal (30) is used to perform a five-level adaptation in the LMS coefficient equalizer (34) to provide a fine estimate of coefficients to said FIR filter (14). The method utilizes the robustness of a three-level PR4-target LMS adaptation of the EPR4 read channel in order to establish an initial setting of the coefficients of a newly-built system, which does not have very well known channel characteristics. With the initial FIR coefficients being in the neighborhood of the final coefficients, a more refined adaptation method can be used. The LMS adaptation performed on the five-level detector input will result in a better system performance with lower bit error rate.

11 Claims, 1 Drawing Sheet

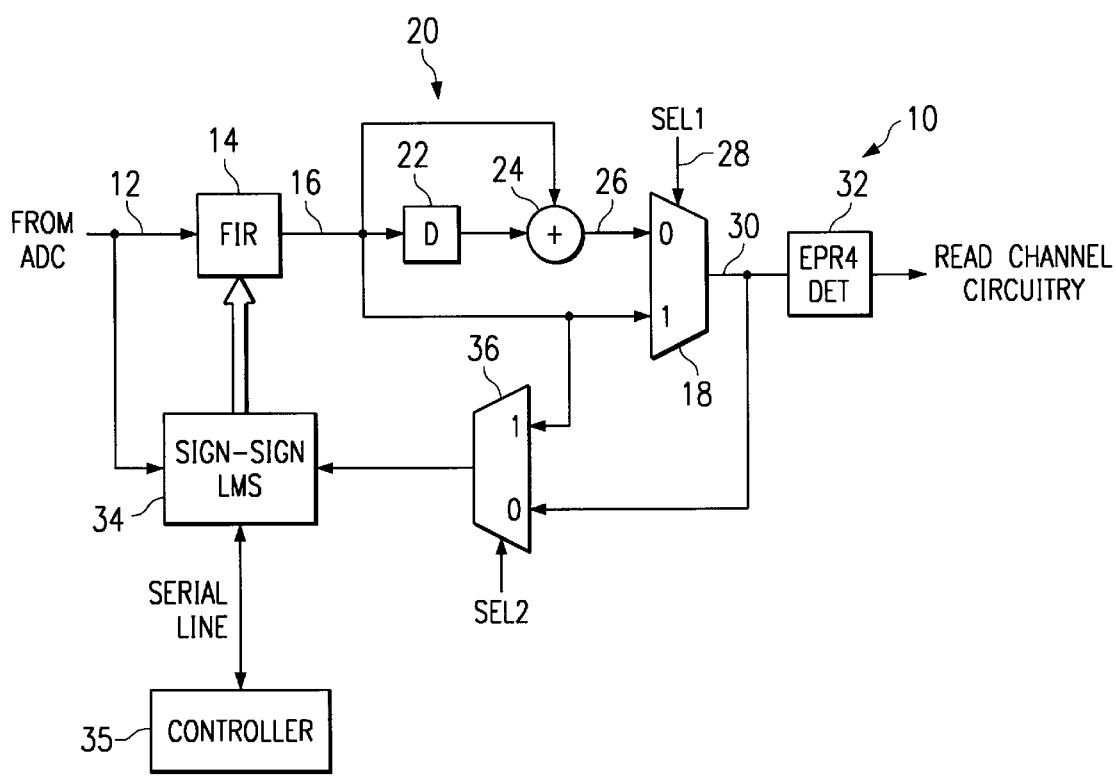

METHOD AND ARCHITECTURE TO FACILITATE ACHIEVING A FAST EPR4 EQUALIZATION START-UP IN A MAGNETIC RECORDING READ CHANNEL

CROSS REFERENCES TO RELATED APPLICATIONS

This application claims the benefit of prior filed provisional application Ser. No. 60/122,196, filed Mar. 1, 1999.

This application is a continuation-in-part of copending patent application 09/224,364, filed Dec. 31, 1998, which is hereby incorporated by reference.

This application is a continuation-in-part of copending patent application 09/256,568, filed Feb. 24, 1999, which is hereby incorporated by reference.

This application is a continuation-in-part of copending patent application 09/258,045, filed Feb. 25, 1999, which is hereby incorporated by reference.

This application is a continuation-in-part of copending patent application 09/256,420, filed Feb. 24, 1999, which is hereby incorporated by reference.

This application is a continuation-in-part of copending patent application 09/258,594, filed Feb. 26, 1999, which is hereby incorporated by reference.

This application is a continuation-in-part of copending patent application 09/258,827, filed Feb. 25, 1999, which is hereby incorporated by reference.

BACKGROUND OF THE INVENTION

1. Field of the Invention

This invention is related to improvements in dynamic information storage or retrieval devices, such as mass data storage devices, or the like, and to improvements in components thereof and methods of operating same, and more particularly to improvements in methods and apparatuses for establishing coefficients used in an FIR filter for use in such dynamic information storage or retrieval devices, or the like to enable a fast EPR4 equalization start up.

2. Relevant Background

In the construction of dynamic information storage or retrieval devices, or the like, and in particular in the construction of the data channel used in digital magnetic recording systems, such as hard disk drives used in conjunction with digital computer systems, or the like, there has been significant recent interest in Partial Response Maximum-Likelihood (PRML) signaling techniques. The most common PRML systems are PR4ML (a partial response class 4). Maximum-likelihood detectors, which use a Viterbi algorithm, are generally used for these partial response channels. In such systems, maximum-likelihood detection techniques are widely used, and involve probabilistic techniques for determining data states in the data channel.

The PRML equalization of a magnetic recording read channel is usually accomplished by a continuous-time filter, CTF, that is implemented using analog techniques, followed by a finite-impulse response filter, FIR. The FIR filter can be implemented in one of two ways: either in a sampled analog fashion or in a pure digital fashion. In the former case, the CTF and FIR a sample-and-hold circuit separates the circuits, whereas in the latter case, an analog-to-digital converter, ADC, separates the two blocks. The proposed method is applicable to both kinds of FIR implementations. A special "indirect EPR4 mode" additionally includes a 1+D operation block that transforms PR4 equalized samples into EPR4 equalized samples.

The chief purpose of the CTF filter is to provide an anti-aliasing filter to limit the spectral contents of the signal and noise beyond the Nyquist frequency. However, the CIF filters are inherently difficult to tune and adapt. It is the FIR filter, nowadays, that plays the major role in achieving the fine signal equalization to the desired PRML target. With the advent of deep submicron CMOS processes, the digital FIR filters with sophisticated Least Mean Square, LMS, coefficient adaptation algorithms are becoming less and lest costly, whereas the analog CTF circuits do not scale down very well.

Setting the CTF filter parameters, such as boost, bandwidth and zero asymmetry and finding a good initial value of the FIR coefficients for an LMS adaptation of a EPR4 read channel system is quite a difficult and time-consuming task. If the FIR initial coefficients are not set correctly, the LMS adaptation will not converge and another trial is needed. Further, for a direct EPR4 system, the equalization, timing and gain loops are less robust and more interdependent. A trial of many initial guess settings dramatically increases the testing time.

Moreover, the LMS adaptation of FIR coefficients is customarily done using a sign-sign LMS algorithm. Here, only a sign bit of the unequalized input data sample and the corresponding equalized output data sample error are used instead of their full value representations. The three-level PR4-target adaptation is quite robust and normally guarantees the adaptation convergence. The five-level EPR4 -target adaptation, on the other hand, because of the narrower "eye-pattern opening", is less robust and less likely to converge if the wrong initial setting of coefficients is used.

SUMMARY OF THE INVENTION

The proposed method utilized the robustness of the three-level PR4-target LMS adaptation of the PR4/EPR4 read channel in order to establish an initial setting of the coefficients of a newly-built system, that is, a system with not very well known channel characteristics. With the thus obtained FIR coefficients being in the neighborhood of the final solution, a more refined but less robust (in face of an incorrect initial setting), adaptation method can be used.

The method of the invention uses a multistep approach, each step being of increasing accuracy, to achieve the ultimately fine equalization of the EPR4 read channel system may be used in conjunction with either indirect or direct EPR4 system operating modes. In an indirect equalization system, the first step is to obtain a rough estimate of the FIR coefficients by performing a robust three-level adaptation at the FIR output. The second step is to switch the source of the FIR equalized data sample error from the three-level FIR output to a five-level output, using a 1+D operation to obtain the five-level output. The LMS adaptation performed on the five-level detector input will result in a better system performance with lower bit error rate.

For the direct EPR4 system operating mode in which the FIR output is directly equalized to the five-level EPR4 targets and the 1-D operation is not ultimately needed, the same steps are performed, and, additionally, a third step is performed to bypass the 1+D operation so that the FIR output data feeds directly to the detector. The FIR output is also directly fed to the LMS block to derive the equalized data samples error. The final FIR coefficients are changed in value from those of the second step of the indirect operating mode, since the 1+D operation is absorbed by the FIR.

Thus, according to a broad aspect of the invention, a method is presented for establishing filter coefficients of an FIR filter in a read channel of a mass data storage device. The method includes using a PR4 adapted signal from the FIR filter in an LMS adaptation circuit to adapt the coefficients of the FIR filter, and after a predetermined time, using an EPR4 adapted signal from the FIR filter to adapt the coefficients of the FIR filter.

According to another broad aspect of the invention, a method is presented for achieving a fast EPR4 equalization start-up for an FIR filter having an output that is directly equalized to five-level EPR4 targets in a magnetic recording read channel. The method uses a PR4 adapted signal form the FIR filter in an LMS adaptation circuit to adapt the coefficients of the FIR filter, and after a predetermined time, using an EPR4 adapted signal from the FIR filter to adapt the coefficients of the FIR filter. Thereafter, the EPR4 signal is used directly from the FIR filter. A 1+D operation may be applied to the PR4 signal from said FIR filter to produce the indirect EPR4 target, which may be used for the initial LMS adaptation. Thereafter, the EPR4 signal directly from the FIR filter may be used by bypassing the 1+D operation.

According to yet another broad aspect of the invention, a method for achieving a fast EPR4 equalization start-up for an FIR filter having an output that is directly equalized to five-level EPR4 targets in a magnetic recording read channel includes using a PR4 adapted signal from the FIR filter in an LMS adaptation circuit to adapt the coefficients of the FIR filter, after a predetermined time, using an EPR4 adapted signal from the FIR filter to adapt the coefficients of the FIR filter. LMS coefficients from the EPR4 signal from the FIR filter may then be recalculated, for example, by an associated controller to obtain a final EPR4 target.

According to still yet another broad aspect of the invention, an apparatus is presented for achieving a fast start-up EPR4 equalization for an FIR filter having an output that is equalized to three-level PR4 targets in a magnetic recording read channel of a mass data storage device. The apparatus includes a 1+D circuit connected to receive said FIR filter output and to provide an EPR4 target output, and a first multiplexer to receive and selectively output said FIR filter output and said EPR4 target output. An LMS adaptation circuit is connected to receive said output of said multiplexer to generate therefrom modified FIR filter coefficients for use in said FIR filter. The three-level PR4 target signal can be selected for first application to said LMS equalization circuit for gross coefficeint adaptation and said five-level EPR4 target signal can be selected for second application to said LMS equalization circuit for fine coefficeint adaptation.

According to yet another broad aspect of the invention, an apparatus is presented for achieving a fast start-up EPR4 equalization for an FIR filter having an output that is equalized to five-level EPR4 targets in a magnetic recording read channel of a mass data storage device. The apparatus includes a circuit connected to receive the FIR filter output and to provide an indirect EPR4 target output to a first multiplexer. The multiplexer receives and selectively outputs either the FIR filter output or an indirect EPR4 target output. An LMS equalization circuit is connected to receive the output of the multiplexer to generate therefrom modified FIR filter coefficients for use in the FIR filter. Thus, the multiplexer can be initially configured to select PR4 equalized target coefficients from the FIR filter for first application to the LMS equalization circuit for gross coefficient adaptation, to select an indirect five-level EPR4 equalized target signal for second application to the LMS equalization circuit for finer coefficient adaptation, and to select a final direct EPR4 output from the FIR for output to a detector circuit.

In light of the above, therefore, one principal advantage of the invention, is that a robust set-up technique for an EPR4 -target can be provided that will easily converge, without the concerns previously encountered in which difficulty in convergence may be encountered using five-level EPR4 -target adaptation.

These and other objects, features and advantages of the invention will be apparent to those skilled in the art from the following detailed description of the invention, when read in conjunction with the accompanying drawings and appended claims.

BRIEF DESCRIPTION OF THE DRAWINGS

The invention is illustrated in the sole FIGURE of the accompanying drawings, which shows a block diagram of a portion of a read channel of a mass data storage device illustrating the circuitry for facilitating a fast EPR4 equalization start-up in a magnetic recording read channel, in accordance with a preferred embodiment of the invention.

DETAILED DESCRIPTION OF THE PREFERRED EMBODIMENTS

A block diagram 10 of a portion of a read channel of a mass data storage device or the like, is shown in FIG. 1. Downstream from the circuit, signals are generated from a read head reproducing data previously recorded on a hard disk drive, or the like (not shown). The data are initially filtered in a continuous time filter (not shown) and are digitized, for instance, by an analog to digital converter (not shown) or by a sample and hold circuit together with a quantizer (not shown).

The digitized signals are applied on input line 12 to a finite impulse response filter (FIR) 14. The FIR 14 is of the type that has dynamically configurable or changeable coefficients to adapt to the particular circuit configurations, all as well known in the art. The FIR filter 14 provides coefficients that determine whether the output signal on line 16 is PR4 or EPR4 , as is known; in accordance with a preferred embodiment of the invention, the filter 14 provides an output signal constellation that is equalized for a three level PR4 target.

The output from the FIR 14 is provided on output line 16, which goes to a multiplexer 18 and to a 1 plus D circuit 20. The 1 plus D circuit 20 includes a delay block 22, which introduces a delay, in known manner. The output from the delay block 22 is added to the signal on the output line 16 from the FIR by an adder 24 to provide an output on line 26 to another or second input of the multiplexer 18 as a five level constellation of EPR4 equalized target signals. Thus, configuring the multiplexer 18 to select either input 0 or 1 by a selection signal, SEL1, on line 28, the output from the multiplexer 18 on line 30 can be chosen to be either PR4 or indirect EPR4 equalized samples. The samples on line 30 are connected to the input of a detector 32, the output of which is provided to the remaining data read channel circuitry (not shown).

The circuit 10 employs a least means squared (LMS) circuit 34 that develops coefficient corrections for application to the FIR 14, also in known manner. However, the error correction input signal to the LMS circuit 34 is selectable to be either the output from the FIR 14 directly, as provided on line 16, or the output from the multiplexer 18 from line 30, by a second multiplier 36, which is controlled by a second select signal SEL2.)

Thus, in operation, upon initial startup of the circuit with which the circuit 10 is associated, the input on line 12 is filtered by the FIR 14 to provide a PR4 equalized target on output line 16. The select signal to the multiplexer 36 is initially set to selects the signal on line 16 to pass directly back to LMS circuit 34 to adjust the coefficients of the FIR 14 in accordance with the PR4 signal. During this phase, a gross adjustment of the FIR coefficients is performed using the three state PR4 equalized target values. It should be noted that the three state PR4 equalized target is relatively easy to equalize to, in comparison to the five state EPR4 equalized target cluster. The multiplexer 18, meanwhile, can be configured to pass either the PR4 equalized target on line 16 or the EPR4 signal on line 26 to the detector 32. Preferably, the multiplexer 18 is configured to pass the EPR4 signal.

After an initial start-up period during which the coefficients of the FIR are configured in response to the PR4 signals applied to the LMS circuit 34, the select signal to the multiplexer 36 is changed to select the output signal on line 30 from the multiplexer 18, which, is the indirect EPR4 signal on line 26 that is generated by the addition of the delay provided by the delay block 22. During this phase, the EPR4 signal is fed back to the LMS circuitry 34, which now adapts the previously determined PR4 coefficients by coefficients generated in response to the EPR4 signal. The newly adapted FIR coefficients are then applied to the FIR 14, and the setup phase is complete. Thus, the final signal adaptation is the five level EPR4 adapted signal. This is a better quality signal than the three level PR4 adapted signal.

The time for the initial adaptation or setup needs to be established to be sufficiently long to allow the system to converge on the PR4 equalized target. This time may vary from system to system, but may include, for example, the processing of several sectors of data from the disk or other data source. It should be noted that the initial PR4 adaptation does not need to process to completion, since the coefficient estimates that are produced would very likely be close enough to enable convergence to an EPR4 equalized target after only after a very short period of time.

Although the initial coefficients may be selected by merely guessing at a coefficient set, the chances are that an initial coefficient guess would not be particularly close to the final coefficient version, since the system parameters are essentially unknown at the beginning of operation. Thus, even though the initial coefficeint estimates derived according to the method and apparatus of the invention may be quite inaccurate, by using the initial PR4 equalized target to adapt the coefficients of the FIR filter, the system will rapidly converge, first to the PR4 target then to the final EPR4 target, which is the final operating state.

Typically the method of the invention would be performed only on the very first time that the system is powered up, so would very likely be performed by the manufacturer of the mass data storage device with which the circuit is associated. The coefficients may be held, for example, in a non-volatile memory, which, except in instances where some minor change in operating parameters may be expected in normal operation, would not be changed after initial set up.

According to an alternate embodiment of the invention, the apparatus shown in the drawing can be used to determine the coefficients of the FIR 14 when a direct EPR4 embodiment is employed. It is noted that in a direct EPR4 embodiment, a 1+D block is not employed in normal operation. Nevertheless, generally a 1 +D block is present in the device, usually for testing purposes. Even if a 1+D block is not present, it is relatively simple to provide one.

Thus, using the apparatus shown in the drawing, according to the alternative embodiment of the invention in a direct mode of operation, the FIR 14 is used to initially output a PR4 equalized target, which is applied to the 1+D block 20. The output of the 1+D block is an indirect EPR4 target signal. The select line of the multiplexer 18 is selected to pass the indirect EPR4 signal on line 26 to the LMS circuit 34 through the multiplexer 36. The LMS circuit 34 then adapts the coefficients of the FIR filter 14 using the indirect EPR4 signals.

Thereafter, the output of the FIR filter 14 may be selected as the error sign input to the LMS adaptation circuit 34, for example, by the select signal SEL2 to multiplexer 36, to produce new adapted coefficients to the FIR filter 14. If desired, a second LMS adaptation may be optionally performed using the direct EPR4 signals from the FIR filter 14. Thereafter, the select signal, SEL1, to multiplexer 18 can be modified to pass the output of the FIR filter directly to the detector 32.

According to yet another embodiment of the invention, the final adaptation steps in the direct EPR4 may be performed by a controller, microprocessor, or the like. Since a controller is typically associated with an LMS adaptation circuit, usually via a serial line, such controller may be suitable for such coefficient recalculation. Thus, after the indirect EPR4 coefficient adaptation has been performed, the controller 35 may be employed to recalculate the final coefficients for application to the FIR filter 14. The recalculated values will be passed to the LMS adaptation circuit 34 via the serial line. The adaptation process may be iterated one more time using the direct EPR4 target output from the FIR 14, if desired.

Thus, the invention uses a multistep approach of increasing accuracy to achieve the ultimately fine equalization of the EPR4 read channel system. The LMS adaptation performed on the five-level detector input will result in a better system performance with lower bit error rate.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method for achieving a fast EPR4 equalization start-up for an FIR filter in a magnetic recording read channel, comprising:

performing a three-level adaptation in an LMS coefficient adaptation circuit at an FIR output to provide a rough estimate of coefficients to said FIR filter;

performing a 1+D operation on the FIR output to generate an EPR4 equalized signal;

applying the EPR4 signal to an input of a detector;

after a predetermined time, using the EPR4 equalized signal to perform a five-level adaptation in the LMS coefficient equalizer to provide a fine estimate of coefficients to said FIR filter.

2. A method for achieving a fast EPR4 equalization start-up for an FIR filter having an output that is directly equalized to five-level EPR4 targets in a magnetic recording read channel, comprising:

using a PR4 adapted signal from the FIR filter in an LMS adaptation circuit to adapt the coefficients of the FIR filter;

after a predetermined time, using an EPR4 adapted signal from the FIR filter to adapt the coefficients of the FIR filter;

and thereafter using the EPR4 signal directly from the FIR filter.

3. The method of claim 2 wherein said using an EPR4 adapted signal from the FIR filter to adapt the coefficients of the FIR filter comprises applying a 1+D operation to a PR4 signal from said FIR filter, and said using the EPR4 signal directly from the FIR filter comprises bypassing the 1+D operation.

4. The method of claim 2 further comprising performing an additional LMS adaptation based upon the EPR4 signal directly from the FIR filter.

5. A method for achieving a fast EPR4 equalization start-up for an FIR filter having an output that is directly equalized to five-level EPR4 targets in a magnetic recording read channel, comprising:

using a PR4 adapted signal from the FIR filter in an LMS adaptation circuit to adapt the coefficients of the FIR filter;

after a predetermined time, using an EPR4 adapted signal from the FIR filter to adapt the coefficients from the FIR filter;

thereafter providing the EPR4 signal from the FIR filter;

recalculating LMS coefficients from the EPR4 signal from the FIR filter to obtain a final EPR4 target.

6. The method of claim 5 further comprising performing an additional LMS adaptation based upon the recalculated LMS coefficients.

7. Apparatus for achieving a fast start-up EPR4 equalization for an FIR filter having an output that is equalized to three-level PR4 targets in a magnetic recording read channel of a mass data storage device, comprising:

a 1+D circuit connected to receive said FIR filter output and to provide an EPR4 target output;

a first multiplexer to receive and selectively output said FIR filter output and said EPR4 target output;

an LMS equalization circuit connected to receive said output of said multiplexer to generate therefrom modified FIR filter coefficients for use in said FIR filter;

wherein the three-level PR4 target signal can be selected for first application to said LMS equalization circuit for gross coefficeint adaptation and said five-level EPR4 target signal can be selected for second application to said LMS equalization circuit for fine coefficient adaptation.

8. The apparatus of claim 7 further comprising an EPR4 equalized signal detector circuit and a second multiplexer connected to receive and selectively output said EPR4 target output and said FIR filter output to said detector, wherein said multiplexer can be operated to selectively apply the EPR4 target output from said 1+D circuit or an EPR4 equalized output from said FIR filter after said FIR coefficients have been adapted to an EPR4 target.

9. Apparatus for achieving a fast start-up EPR4 equalization for an FIR filter having an output that is equalized to five-level EPR4 targets in a magnetic recording read channel of a mass data storage device, comprising:

a circuit connected to receive said FIR filter output and to provide an indirect EPR4 target output;

a first multiplexer to receive and selectively output said FIR filter output and said indirect EPR4 target output;

an LMS equalization circuit connected to receive said output of said multiplexer to generate therefrom modified FIR filter coefficients for use in said FIR filter;

wherein the multiplexer can be initially configured to select a PR4 equalized target coefficients from said FIR filter for first application to said LMS equalization circuit for gross coefficeint adaptation, to select an indirect five-level EPR4 equalized target signal for second application to said LMS equalization circuit for finer coefficient adaptation, and to select a final direct EPR4 output from said FIR for output to a detector circuit.

10. The apparatus of claim 9 wherein said circuit to provide an indirect EPR4 target output is an 1+D block.

11. The apparatus of claim 9 further comprising a controller for recalculating LMS coefficients from said indirect EPR4 target output.

* * * * *